(12) United States Patent
Thies

(10) Patent No.: US 12,447,450 B2
(45) Date of Patent: Oct. 21, 2025

(54) METHOD AND FLUIDIZATION APPARATUS UNIT FOR TREATING A LARGE NUMBER OF BATCHES OF A MATERIAL HAVING A MOISTURE CONTENT

(71) Applicant: Glatt Gesellschaft mit beschränkter Haftung, Binzen (DE)

(72) Inventor: Jochen Thies, Lörrach (DE)

(73) Assignee: Glatt Gesellschaft mit beschränkter Haftung, Binzen (DE)

( * ) Notice: Subject to any disclaimer, the term of this patent is extended or adjusted under 35 U.S.C. 154(b) by 224 days.

(21) Appl. No.: 18/010,106

(22) PCT Filed: Feb. 25, 2021

(86) PCT No.: PCT/EP2021/054648
§ 371 (c)(1),
(2) Date: Dec. 13, 2022

(87) PCT Pub. No.: WO2022/002445
PCT Pub. Date: Jan. 6, 2022

(65) Prior Publication Data
US 2023/0347307 A1  Nov. 2, 2023

(30) Foreign Application Priority Data
Jul. 1, 2020  (DE) ............... 10 2020 208 204.9

(51) Int. Cl.
*B01J 2/16* (2006.01)
*F26B 3/08* (2006.01)

(52) U.S. Cl.
CPC ............... *B01J 2/16* (2013.01); *F26B 3/082* (2013.01)

(58) Field of Classification Search
CPC .................................. F26B 5/082; B01J 2/16
USPC ............................................................ 34/360
See application file for complete search history.

(56) References Cited

U.S. PATENT DOCUMENTS

| | | | | |
|---|---|---|---|---|
| 942,150 A | * | 12/1909 | Tiemann | F26B 21/08 34/396 |
| 3,675,600 A | * | 7/1972 | Jones | F26B 23/022 110/233 |
| 4,085,518 A | * | 4/1978 | Jackson | F26B 21/14 34/104 |
| 4,696,115 A | | 9/1987 | Spadafora | |
| 6,345,450 B1 | * | 2/2002 | Elder | F26B 21/06 34/396 |
| 6,971,187 B1 | * | 12/2005 | Pikal | F26B 5/06 34/92 |

(Continued)

FOREIGN PATENT DOCUMENTS

| | | | | |
|---|---|---|---|---|
| CN | 115768554 A | * | 3/2023 | ............... B01J 2/16 |
| DE | 102020208204 B3 | * | 6/2021 | ............... B01J 2/16 |

(Continued)

*Primary Examiner* — Stephen M Gravini
(74) *Attorney, Agent, or Firm* — The Webb Law Firm

(57) ABSTRACT

A method and a fluidization apparatus unit for treating a large number of batches of a material having a moisture content and having a material temperature. The fluidization apparatus unit includes a fluidization apparatus. The fluidization apparatus has a fluidization chamber which has a material inlet and a material outlet, and also includes a fluid inlet and a fluid outlet for a drying gas which fluidizes the material in the fluidization chamber and which has a drying gas moisture content.

15 Claims, 7 Drawing Sheets

(56) References Cited

U.S. PATENT DOCUMENTS

| | | | | |
|---|---|---|---|---|
| 7,191,547 | B2* | 3/2007 | Wiedl | F26B 21/083 34/80 |
| 8,857,074 | B2* | 10/2014 | Bernon | B27K 5/0085 34/396 |
| 10,278,898 | B2 | 5/2019 | Sawaguchi et al. | |
| 10,546,762 | B2* | 1/2020 | Bergman | H01L 21/67034 |
| 11,181,319 | B2* | 11/2021 | Neumann Roeschmann | F26B 21/04 |
| 11,384,980 | B2* | 7/2022 | Triglia, Jr. | F26B 13/008 |
| 12,025,374 | B2* | 7/2024 | Raoult | F26B 21/10 |
| 2007/0013092 | A1 | 1/2007 | Sakata et al. | |
| 2009/0220664 | A1 | 9/2009 | Tate et al. | |
| 2019/0186832 | A1 | 6/2019 | Saribal et al. | |
| 2023/0347307 | A1* | 11/2023 | Thies | F26B 3/082 |
| 2024/0408540 | A1* | 12/2024 | Thies | B01D 53/26 |

FOREIGN PATENT DOCUMENTS

| | | | | |
|---|---|---|---|---|
| EP | 3160420 B1 | 4/2019 | | |
| JP | S62234538 A | 10/1987 | | |
| JP | H7239182 A | 9/1995 | | |
| JP | H994455 A | 4/1997 | | |
| JP | 2004138448 A | 5/2004 | | |
| JP | 200566449 A | 3/2005 | | |
| JP | 2023531035 A | * | 7/2023 | |
| WO | WO-2022002445 A1 | * | 1/2022 | B01J 2/16 |

\* cited by examiner

| t [min] | $T_{TG,V1,FE}$ [°C] | | $T_{G,V1}$ [°C] | | $f_{TG,V1,FE}$ [g/kg] | $V_{TG,V1,FE}$ [m³/h] | |
|---|---|---|---|---|---|---|---|
| | S | I | S | I | | S | I |
| 0 | 60 | 60,1 | 42±1 | 32,1 | 7,6 | 70 | 70 |
| 5 | 60 | 57,9 | 42±1 | 24 | 7,6 | 70 | 70 |
| 10 | 60 | 59,6 | 42±1 | 24,5 | 7,6 | 70 | 70 |
| 15 | 60 | 60 | 42±1 | 25,1 | 7,6 | 70 | 70 |
| 20 | 60 | 60 | 42±1 | 26,1 | 7,6 | 70 | 70 |
| 25 | 60 | 60 | 42±1 | 28,6 | 7,6 | 70 | 70 |
| 30 | 60 | 60 | 42±1 | 32,9 | 7,6 | 70 | 70 |
| 35 | 60 | 60 | 42±1 | 37,6 | 7,6 | 70 | 70 |
| 42 | 60 | 60 | 42±1 | 42,1 | 7,6 | 70 | 70 |

| t [min] | $T_{TG,V2,FE}$ [°C] | | $T_{G,V2}$ [°C] | | $f_{TG,V2,FE}$ [g/kg] | $V_{TG,V2,FE}$ [m³/h] | |
|---|---|---|---|---|---|---|---|
| | S | I | S | I | | S | I |
| 0 | 60 | 60,1 | 42±1 | 32,3 | 19,5 | 70 | 70 |
| 5 | 60 | 56,9 | 42±1 | 27,9 | 19,5 | 70 | 70 |
| 10 | 60 | 58,7 | 42±1 | 29 | 19,5 | 70 | 70 |
| 15 | 60 | 60 | 42±1 | 29,4 | 19,5 | 70 | 70 |
| 20 | 60 | 60 | 42±1 | 32,6 | 19,5 | 70 | 70 |
| 25 | 60 | 60 | 42±1 | 32,8 | 19,5 | 70 | 70 |
| 30 | 60 | 60 | 42±1 | 32,9 | 19,5 | 70 | 70 |
| 35 | 60 | 60 | 42±1 | 35,6 | 19,5 | 70 | 70 |
| 40 | 60 | 60 | 42±1 | 39,9 | 19,5 | 70 | 70 |
| 44 | 60 | 60 | 42±2 | 42,1 | 19,5 | 70 | 70 |

| t [min] | $T_{TG,V3,FE}$ [°C] | | $T_{G,V3}$ [°C] | | $f_{TG,V3,FE}$ [g/kg] | $V_{TG,V3,FE}$ [m³/h] | |
|---|---|---|---|---|---|---|---|
| | S | I | S | I | | S | I |
| 0 | 65 | 64,5 | 42±1 | 33,5 | 7 | 70 | 69 |
| 5 | 65 | 60,1 | 42±1 | 24,3 | 7 | 70 | 70 |
| 10 | 65 | 63,9 | 42±1 | 24,8 | 7 | 70 | 70 |
| 15 | 65 | 65 | 42±1 | 25,6 | 7 | 70 | 70 |
| 20 | 65 | 65 | 42±1 | 26,3 | 7 | 70 | 73 |
| 25 | 65 | 65 | 42±1 | 28,4 | 7 | 70 | 68 |
| 30 | 65 | 65 | 42±1 | 34,5 | 7 | 70 | 67 |
| 35 | 65 | 65 | 42±1 | 39,2 | 7 | 70 | 72 |
| 39 | 65 | 65 | 42±1 | 42,2 | 7 | 70 | 67 |

| t [min] | $T_{TG,V4,FE}$ [°C] | | $T_{G,V4}$ [°C] | | $f_{TG,V4,FE}$ [g/kg] | $V_{TG,V4,FE}$ [m³/h] | |
|---|---|---|---|---|---|---|---|
| | S | I | S | I | | S | I |
| 0 | 65 | 65 | 42±1 | 33 | 19,5 | 70 | 70 |
| 5 | 65 | 60,6 | 42±1 | 28,3 | 19,5 | 70 | 75 |
| 10 | 65 | 64,3 | 42±1 | 30,4 | 19,5 | 70 | 67 |
| 15 | 65 | 64,9 | 42±1 | 30,6 | 19,5 | 70 | 67 |
| 20 | 65 | 65,1 | 42±1 | 32,3 | 19,5 | 70 | 70 |
| 25 | 65 | 65 | 42±1 | 32,3 | 19,5 | 70 | 72 |
| 30 | 65 | 65 | 42±1 | 32,9 | 19,5 | 70 | 70 |
| 35 | 65 | 65,1 | 42±1 | 37,8 | 19,5 | 70 | 70 |
| 40 | 65 | 65 | 42±1 | 38,4 | 19,5 | 70 | 70 |
| 47 | 65 | 65 | 42±1 | 42,1 | 19,5 | 70 | 70 |

| t [min] | $T_{TG,V5,FE}$ [°C] | | $T_{G,V5}$ [°C] | $f_{TG,V5,FE}$ [g/kg] | $V_{TG,V5,FE}$ [m³/h] | |
|---|---|---|---|---|---|---|
| | S | l | | | S | l |
| 0 | 60 | 59,9 | 48,1 | 8,2 | 70 | 70 |
| 5 | 60 | 55,4 | 24 | 8,2 | 70 | 73 |
| 10 | 60 | 59,2 | 24,4 | 8,2 | 70 | 71 |
| 15 | 60 | 60 | 25,1 | 8,2 | 70 | 67 |
| 20 | 60 | 60 | 25,3 | 8,2 | 70 | 72 |
| 25 | 60 | 60 | 27,1 | 8,2 | 70 | 67 |
| 30 | 60 | 60 | 30 | 8,2 | 70 | 72 |
| 35 | 60 | 60 | 34,5 | 8,2 | 70 | 69 |
| 40 | 60 | 60 | 38,6 | 8,2 | 70 | 68 |
| 47 | 60 | 60 | 42,1 | 8,2 | 70 | 68 |

| t [min] | $T_{TG,V6,FE}$ [°C] | | $T_{G,V6}$ [°C] | $f_{TG,V6,FE}$ [g/kg] | $V_{TG,V6,FE}$ [m³/h] | |
|---|---|---|---|---|---|---|
| | S | I | | | S | I |
| 0 | 60 | 60 | 46,2 | 20 | 70 | 70 |
| 5 | 60 | 56 | 39,7 | 20 | 70 | 72 |
| 10 | 60 | 59,3 | 30,5 | 20 | 70 | 71 |
| 15 | 60 | 59,9 | 30,8 | 20 | 70 | 71 |
| 20 | 60 | 60,1 | 31,3 | 20 | 70 | 71 |
| 25 | 60 | 60 | 31,9 | 20 | 70 | 72 |
| 30 | 60 | 60 | 33 | 20 | 70 | 70 |
| 35 | 60 | 60 | 35,6 | 20 | 70 | 70 |
| 40 | 60 | 60 | 36,2 | 20 | 70 | 71 |
| 45 | 60 | 60 | 38,8 | 20 | 70 | 71 |
| 50 | 60 | 60 | 41,5 | 20 | 70 | 72 |
| 55 | 60 | 60 | 43,1 | 20 | 70 | 64 |
| 80 | 60 | 60 | 48,6 | 20 | 70 | 70 |

| t [min] | $T_{TG,V7,FE}$ [°C] | | $T_{G,V7}$ [°C] | $f_{TG,V7,FE}$ | $V_{TG,V7,FE}$ [m³/h] | |
|---|---|---|---|---|---|---|
| | S | I | | | S | I |
| 0 | 65 | 64,3 | 48,2 | 8 | 70 | 69 |
| 5 | 65 | 61,8 | 23,7 | 8 | 70 | 67 |
| 10 | 65 | 64,3 | 24,3 | 8 | 70 | 69 |
| 15 | 65 | 65,1 | 24,8 | 8 | 70 | 71 |
| 20 | 65 | 65 | 25,5 | 8 | 70 | 71 |
| 25 | 65 | 65,2 | 27,5 | 8 | 70 | 63 |
| 30 | 65 | 65 | 32,3 | 8 | 70 | 67 |
| 35 | 65 | 65 | 37,6 | 8 | 70 | 67 |
| 40 | 65 | 65 | 41,8 | 8 | 70 | 65 |

Fig. 12

| t [min] | $T_{TG,V8,FE}$ [°C] | | $T_{G,V8}$ [°C] | $f_{TG,V8,FE}$ | $V_{TG,V8,FE}$ [m³/h] | |
|---|---|---|---|---|---|---|
| | S | I | | | S | I |
| 0 | 65 | 64,7 | 52,4 | 20 | 70 | 70 |
| 5 | 65 | 60,4 | 31,2 | 20 | 70 | 72 |
| 10 | 65 | 64,8 | 31,8 | 20 | 70 | 71 |
| 15 | 65 | 64,9 | 31,9 | 20 | 70 | 71 |
| 20 | 65 | 64,9 | 32,7 | 20 | 70 | 71 |
| 25 | 65 | 65,1 | 34,1 | 20 | 70 | 72 |
| 30 | 65 | 65,1 | 36,2 | 20 | 70 | 70 |
| 35 | 65 | 65,1 | 39,9 | 20 | 70 | 70 |
| 40 | 65 | 65,1 | 44 | 20 | 70 | 71 |
| 45 | 65 | 65,1 | 46,5 | 20 | 70 | 71 |
| 50 | 65 | 65,1 | 49,3 | 20 | 70 | 72 |

Fig. 13

METHOD AND FLUIDIZATION APPARATUS UNIT FOR TREATING A LARGE NUMBER OF BATCHES OF A MATERIAL HAVING A MOISTURE CONTENT

CROSS-REFERENCE TO RELATED APPLICATIONS

This application is the United States national phase of International Application No. PCT/EP2021/054648 filed Feb. 25, 2021, and claims priority to German Patent Application No. 10 2020 208 204.9 filed Jul. 1, 2020, the disclosures of which are hereby incorporated by reference in their entireties.

BACKGROUND

Field

The invention relates to a method for treating a large number of batches of a material having a moisture content and having a material temperature in a fluidization apparatus unit comprising a fluidization apparatus, wherein the fluidization apparatus of the fluidization apparatus unit has a fluidization chamber which has a material inlet and a material outlet, which also comprises a fluid inlet and a fluid outlet for a drying gas which fluidizes the material in the fluidization chamber and which has a drying gas moisture content, wherein, during the treatment of the material of a batch in the fluidization apparatus, in a first treatment period at least part of a liquid in the material of the batch that has been introduced into the fluidization chamber, which constitutes the moisture content in the material, is evaporated by heat being supplied by means of the drying gas, such that the material of the batch cools down from an initial material temperature to a material minimum temperature as a result of the associated removal of evaporation heat and, in a second treatment period, liquid is further evaporated by the heat supplied by means of the drying gas, such that the material of the batch heats up to a material end temperature, and consequently the moisture content of the material of the batch is reduced to a residual moisture content during the treatment.

Furthermore, the invention relates to a fluidization apparatus unit for treating a large number of batches of a material having a moisture content and having a material temperature, with a fluidization apparatus and a control device, wherein the fluidization apparatus has a fluidization chamber which has a material inlet and a material outlet, and which also comprises a fluid inlet and a fluid outlet for a drying gas which fluidizes the material in the fluidization chamber and which has a drying gas moisture content, wherein, during the treatment of the material of a batch in the fluidization apparatus, in a first treatment period at least part of a liquid in the material of the batch that has been introduced into the fluidization chamber, which constitutes the moisture content in the material, is evaporated by heat being supplied by means of the drying gas, such that the material of the batch cools down from an initial material temperature to a material minimum temperature as a result of the associated removal of evaporation heat and, in a second treatment period, liquid is further evaporated by the heat supplied by means of the drying gas, such that the material of the batch heats up to a material end temperature, and consequently the moisture content of the material of the batch is reduced to a residual moisture content during the treatment.

DESCRIPTION OF RELATED ART

Fluidization apparatuses that work in batches have been known for a long time. Such fluidization apparatuses are designed in particular as fluidized bed or spouted bed apparatuses and have a fluidization chamber for batch treatment of the material, in which fluidization chamber the material to be treated is fluidized and dried by a drying gas which has a drying gas moisture content.

During the treatment of the material of a batch in the fluidization apparatus, which treatment has a treatment time, at least part of a liquid that constitutes the moisture content in the material of the batch introduced into the fluidization chamber is evaporated in a first treatment period by heat being supplied by means of the drying gas, such that the material of the batch cools down by an associated removal of evaporation heat from an initial material temperature to a material minimum temperature. In this case, the free liquid in the material is evaporated until an equilibrium is established between the amount of liquid in the material (moisture) and the moisture content in the drying gas. Any change in drying gas moisture content has a direct/proportional effect on the moisture content flow between the material and the drying gas. The equilibrium depends on the drying gas moisture content at the fluid inlet and the hygroscopic properties of the material.

In a second treatment period, more liquid is evaporated by the heat supplied by means of the drying gas, such that the material of the batch heats up to a material end temperature, and the moisture content in the material of the batch is reduced to a residual moisture content during the treatment. The primary limiting factor in this case is the intergranular mass transport for the moisture content flow between the material and the drying gas. The capillary forces between the liquid in the material and the material also become more relevant for the moisture content flow occurring between the material and the drying gas.

The residual moisture content remaining in the material after the treatment is therefore of very great importance, since if the residual moisture content in the treated material is too high after the treatment, there is a risk of microbiological contamination, and if the residual moisture content in the treated material is too low during a subsequent pressing of the material into, for example, tablets, problems such as reduced tablet hardness in particular may arise.

In the previously known methods, to treat a large number of batches of a material having a moisture content and having a material temperature in a fluidization apparatus, a material end temperature is set before the treatment. When the material end temperature is reached, the treatment of the material in the fluidization apparatus is stopped and the material is discharged from the fluidization apparatus. The disadvantage of ending the treatment using the prespecified material end temperature that is set before the start of the treatment is the fact that the residual moisture content in the material does not only depend on the material end temperature, but also on other process parameters, such as in particular the moisture content in the drying gas. As such, treatment of the same material with drying gases having a different drying gas moisture content leads to different residual moisture contents in the treated material. A higher drying gas moisture content accordingly leads, for example, both to a longer treatment time and to a higher residual moisture content in the treated material.

In addition, it is known that an in-line measurement of the moisture content in the material using a moisture content sensor can achieve greater accuracy with regard to the residual moisture content that can be achieved in the treated material. The disadvantages of this, however, are the high investment costs for the moisture content sensor on the one hand, and the ongoing effort involved in material-specific calibration of the moisture content sensor on the other hand—for treating different materials in the fluidization apparatus.

SUMMARY

The object of the invention is therefore to provide a method and a fluidization apparatus unit for treating a large number of batches of a material having a moisture content and having a material temperature, wherein the material of a first batch treated in the fluidization apparatus unit according to the method has the same residual moisture content as a second batch of the material, and at the same time overcomes the disadvantages of the known methods.

The object is achieved in a method of the type mentioned at the outset in that the material end temperature is found as the mathematical sum of the individual material minimum temperature for the material of a batch and a prespecified increase temperature that is the same for each batch of the material. Advantageously, no further apparatus components are required for the method according to the invention, such as moisture content sensors or the like suitable for automatic in-line measurement. Rather, the method can be implemented solely by adjustments in the control software of the control device.

According to a refinement of the method that is advantageous in this regard, the increase temperature is determined in a reference measurement, the increase temperature corresponding to a temperature difference between the material minimum temperature of the material treated in the reference measurement and the material end temperature of the material treated in the reference measurement. The treatment of a first batch of the material of a large number of batches of the material in the fluidization apparatus particularly preferably serves as a reference measurement. In addition, the reference measurement can also be carried out before the treatment of a large number of batches of a material in the fluidization apparatus, as a separate treatment of the same material. That is to say, a separate measurement of a batch of the material takes place even before the actual treatment of the large number of batches of the material. Such reference measurements offer the advantage of measuring many materials accordingly, and thus, for example, building up a database for a great diversity of materials to be treated.

As such, according to an additional advantageous refinement of the method, the increase temperature is determined from a database before the treatment of a large number of batches of a material in the fluidization apparatus. As a result, a corresponding increase temperature for treating the large number of batches can be selected very quickly and easily. In addition, the database makes it possible to estimate the increase temperature for the desired residual moisture content for unknown, not-yet-measured materials based on similar, already-measured materials.

In a further advantageous embodiment of the preferred method, the material to be treated is produced in a granulating device arranged upstream of the fluidization apparatus, and is then fed to the fluidization apparatus. However, the material to be treated can also be produced in the fluidization apparatus, for example in a fluidized bed apparatus performing spray granulation.

In addition, in an advantageous method, the material minimum temperature is found as the mean value of the material temperature in a time interval. By using a mean value as the material minimum temperature, fluctuations in the material temperature are compensated for, and the material minimum temperature is "smoothed", so to speak. As a result, the residual moisture contents of the large number of batches of a material are even better matched to one another. In this regard, the time interval preferably begins when the material minimum temperature is reached. More preferably, when calculating the material minimum temperature in the form of the mean value of the temperature of the material in a specific time interval, the lowest temperature of the material is weighted more heavily, preferably doubled.

According to a further advantageous embodiment of the method, the material minimum temperature is found as the mean value of the material temperature in a temperature interval, preferably in a temperature interval of $_+5°$ C. around the lowest material temperature, more preferably in a temperature interval of $_+3°$ C. around the lowest material temperature. By using a mean value as the material minimum temperature, fluctuations in the material temperature are compensated for, and the material minimum temperature is "smoothed", so to speak. As a result, the residual moisture contents of the large number of batches of a material are even better matched to one another. In this case, too, there is the possibility, when calculating the material minimum temperature in the form of the mean value of the temperature of the material in a specific temperature interval, to weight the lowest temperature of the material more heavily, preferably double.

The fluidization apparatus preferably has a spray device which sprays the material of a batch with a liquid at least at times during the treatment. By spraying the material in the fluidization apparatus, for example, agglomeration processes can be started, or additives can be introduced into the material, so that the properties of the material to be treated are further improved.

According to an additional advantageous embodiment of the method, the treatment of a batch of the material in the fluidization apparatus unit comprising the fluidization apparatus is stopped after the material end temperature has been reached. This ends the drying process, and the material with the corresponding residual moisture content is then discharged from the fluidization apparatus and, if necessary, subjected to an after-treatment, for example a coating, or subjected to further processing, for example in the form of compression into tablets.

Furthermore, the object is achieved, with a fluidization apparatus unit of the type mentioned at the outset, in that the control device comprises a temperature measuring device suitable for detecting the material minimum temperature and an evaluation device which is suitable for finding the material end temperature as the sum of the individual material minimum temperature for the material of a batch and an increase temperature specified in the evaluation device, which is the same for each batch of the material. The advantage of the design of the fluidization apparatus unit according to the invention is that no further apparatus components are required, such as moisture content sensors or the like suitable for automatic in-line measurement. Rather, the fluidization apparatus unit can be realised solely by adjustments in the con-trot software of the control device. Despite lower investment costs and low running costs, the fluidization apparatus unit according to the invention has the same advantages as a complex in-line moisture content measurement.

According to an advantageous embodiment of the fluidization apparatus unit in this respect, the temperature measuring device has a thermocouple arranged in the fluidization chamber of the fluidization apparatus. As a result, the temperature in the fluidization chamber, which substantially corresponds to the temperature of the material, due to the almost ideal mixing of the material to be treated in the fluidization chamber, can be detected as the material temperature.

The temperature measuring device and the evaluation device preferably form a structural unit. Such a structural unit saves space.

According to an additional advantageous refinement of the fluidization apparatus unit, the fluidization apparatus is designed as a fluidized bed or spouted bed apparatus.

In a further advantageous configuration of the fluidization apparatus unit, the fluidization apparatus has a spray device, preferably a spray nozzle, particularly preferably a multi-component spray nozzle, for a liquid to be applied to the material to be treated.

BRIEF DESCRIPTION OF THE DRAWINGS

The invention is explained in more detail below with reference to the attached drawings.

FIG. 12 is a table with the experimentally determined measurement data of Test 7, for the treatment of a batch of a material having a moisture content and having a material temperature with a fluidization apparatus of a fluidization apparatus unit according to the preferred method, FIG. 13 is a table with the experimentally determined measurement data of Test 8, for the treatment of a batch of a material having a moisture content and having a material temperature with a fluidization apparatus of a fluidization apparatus unit according to the preferred method.

DETAILED DESCRIPTION

Figure 1:
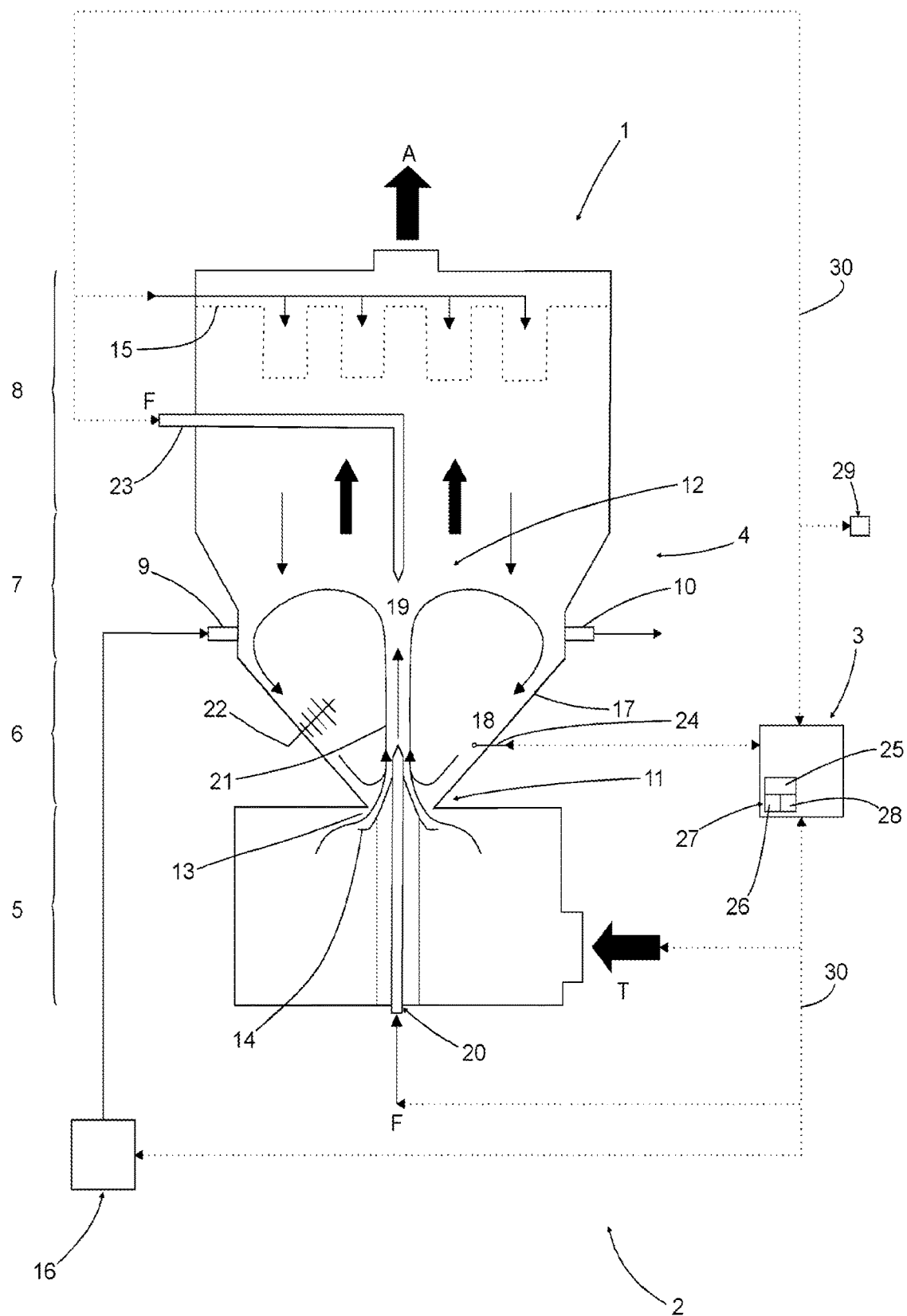
FIG. 1 is a schematic illustration of a first embodiment of a preferred fluidization apparatus unit for treating a large number of batches of a material having a moisture content, with a fluidization apparatus and a control device.

Unless otherwise specified, the following description relates to all of the embodiments illustrated in the drawings of a fluidization apparatus unit 2 that is suitable for treating a material G and that comprises a fluidization apparatus 1.

FIG. 1 is a schematic illustration of a first embodiment of the preferred fluidization apparatus unit 2. The fluidization apparatus unit 2 is suitable for treating a large number of batches of a material G having a moisture content $f_G$ and a material temperature $T_G$, and has a fluidization apparatus 1 and a control device 3.

In the embodiment shown, the fluidization apparatus 1 is designed as a spouted bed apparatus 4. The structure of the spouted bed apparatus 4 comprises, from bottom to top, a distribution chamber 5, a fluidization chamber 6, an expansion zone 7 and an exhaust air part 8.

In an embodiment that is not shown, the fluidization apparatus 1 of the fluidization apparatus unit 2 is designed, for example, as a fluidized bed apparatus or as a fluidized bed granulator.

The fluidization chamber 6 of the fluidization apparatus 1 of the fluidization apparatus unit 2 has a material inlet 9 and a material outlet 10. The fluidization chamber 6 also has a fluid inlet 11 and a fluid outlet 12 for a drying gas TG which fluidizes the material G in the fluidization chamber 6 and which has a drying gas moisture content $f_{TG}$.

The drying gas TG required for drying the material G to be treated in the fluidization apparatus 1 is supplied to the distribution chamber 5, where the drying gas TG enters in distributed form via the fluid inlet 11, which has a gap opening 13 and a drying gas deflection part 14, into the fluidization chamber 6, preferably as a type of free jet. Furthermore, the cross-section of the fluidization apparatus can optionally increase in the expansion zone 7, as shown in FIG. 1, such that the speed of the flow of drying gas in the fluidization apparatus 1 continuously decreases toward the top. The drying gas TG leaves the spouted bed apparatus 4 preferably in the exhaust air part 8 as cleaned exhaust gas A, wherein a deducting system 15, in particular filter cartridges or textile filter elements, is formed in the exhaust air part 8. In the embodiment shown, the fluidization chamber 6 of the fluidization apparatus 1 is supplied via the material inlet 9 with the material G, which has a moisture content $f_G$ and a material temperature $T_G$, from a granulating device 16 arranged upstream of the fluidization apparatus 1. The granulating device 16 is preferably designed as an extruder, or as a high-shear granulator.

In the fluidization chamber 6, the material G is entrained upwards in the direction of the de-dusting system 15 by the drying gas TG. The drying gas velocity $v_{TG}$ decreases in the upper region of the fluidization chamber 6 and in the expansion zone 7 above it, such that the material G flowing upwards can emerge laterally out of the flow of drying gas and fall back into the fluidization chamber 6. The fluidization chamber 6 is delimited in the lower region by inclined lateral surfaces 17. Due to the inclined lateral surfaces 17, the material G is conveyed by the effect of gravity via the return zone 18 in the direction of the fluid inlet 11 designed as a gap opening 13, where the material G is then entrained again by the drying gas TG into the fluidization chamber 6.

A very uniform circulation 19 of the material G is formed by this mechanism, which circulation promotes an almost ideal mixing of the material G. One or more spray devices 20, preferably a spray nozzle or the like, can be or are arranged in the lower region of the fluidization chamber 6 and spray upwards in the same direction as the drying gas TG, serving to introduce an optionally additional liquid F. Such an introduction of the liquid F in the lower region of the fluidization chamber 6 is referred to as a bottom spray.

The spray device 20, preferably a two-component nozzle, is configured to spray droplets with a droplet size of less than 0.5 µm to 200 µm, preferably from 10 µm to 100 µm, particularly preferably between 20 µm and 60 µm. Very particularly preferably, the sprayed droplets have a droplet size of 25 µm to 40 µm, most preferably 30 µm.

By adjusting the droplet size by means of the spray device 20 and the compressed air applied to the spray device 20, the shearing forces occurring during spraying can be set precisely, such that a very homogeneous droplet size of the liquid F to be sprayed—expediently, a suspension or an emulsion—can be achieved and/or reached. The droplets accumulate on the material G, and film evaporation of the liquid F and the moisture content $f_G$ of the material G preferably takes place in the drying gas flow.

Due to the very advantageous heat and mass transfer and the high circulation 19 of the material G in the spraying area 21 of the fluidization chamber 6 of the spouted bed apparatus 4, the liquid F is largely deposited on the material G, which is accordingly uniformly wetted on the material surfaces. The uniform wetting with a simultaneous high circulation 19 of the material G between the spraying area 21 and the return zone 18 causes a very uniform liquid film to be formed on the material G. Because of the drying process, the liquid F, and also a quantity of the liquid F in the material G (moisture content $f_G$) evaporate and leave the spouted bed apparatus 4 with the exhaust gas A.

The treated material G is discharged from the fluidization apparatus 1 via the material outlet 10, which can expediently be embodied as an overflow or as a volumetric discharge element, in particular a rotary valve, or also as a gravity classifier, preferably a zigzag classifier subjected to classifying gas, or a riser tube classifier.

Mechanical units 23, such as shredders, choppers, etc., can be arranged as required in the fluidization chamber 6, preferably in the return zone 18, in order to produce sufficiently fine material G by comminution.

One or more spray devices 23 can optionally be arranged in the fluidization chamber 6 or in the apparatus parts lying above it, the expansion zone 7 and the exhaust air part 8, which preferably spray downwards (top spray). The liquid F can likewise be injected into the fluidization chamber 6 of the spouted bed apparatus 4 via the spray device 23. Alternatively, additives or other components can be sprayed in liquid form via some of the spray devices 20, 23, and thus embedded homogeneously in the material G.

In a further embodiment that is not shown, the spray devices 20, 23 can be arranged in their position in the fluidization chamber 6, in particular also on the lateral surfaces 17.

The control device 3 comprises a temperature measuring device 25 having a thermocouple 24 so for detecting the material temperature $T_G$ and an evaluation device 26 for determining the material minimum temperature $T_{G, \ldots, min}$ from the material temperature $T_G, \ldots$ during the treatment of the material G of the batch. The temperature measuring device 25 and the evaluation device 26 expediently form a structural unit 27.

The thermocouple 24 is arranged in the fluidization chamber 6 of the fluidization apparatus 1. The temperature T in the fluidization chamber 6, which substantially corresponds to the material temperature $T_G, \ldots$ due to the almost ideal mixing of the material G to be treated in the fluidization chamber 6, can be detected as the material temperature $T_G, \ldots$ by means of the thermocouple 24.

The material temperature can be relayed from the thermocouple 24 of the temperature device 25 to the evaluation device 26 of the control device 3 via communication means 30, and can be stored in storage means 28 of the control device 3. The evaluation device 26 is expediently suitable for evaluating the material temperature $T_G, \ldots$ in relation to a material minimum temperature $T_{G, \ldots, min}$, and storing the material minimum temperature $T_{G, \ldots, min}$ in the storage means 28.

In addition, the evaluation device 26 is suitable for storing an increase temperature $T_+$ that is the same for each batch of the material G. The increase temperature $T_+$ can be determined in different ways, preferably by a reference measurement.

The evaluation device 26 is also suitable for calculating a material end temperature $T_{G, \ldots, E}$ as the sum of the individual material minimum temperature $T_{G, \ldots, min}$ for the material G of a batch and an increase temperature $T_+$ specified in the evaluation device 26, which is the same for each batch of the material G.

A database 29 for storing the increase temperatures is also connected to the control device 3, for example, via communication means 30.

Figures 2, 3, 4:
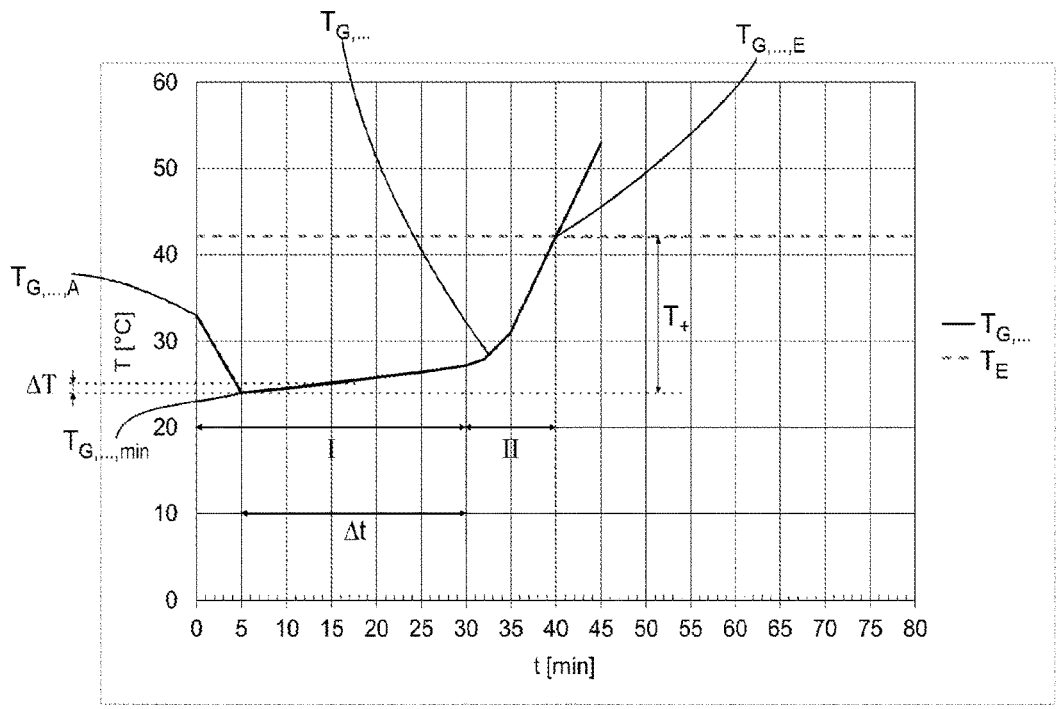
FIG. 2 is a schematic illustration of a basic profile of both the material temperature and the process end temperature shown plotted over time, during the treatment of a batch of material in a fluidization apparatus of a fluidization apparatus unit.
FIG. 3 is a table with the experimentally determined measurement data of Test 1, for the conventional treatment of a batch of a material having a moisture content and having a material temperature with a fluidization apparatus of a fluidization apparatus unit.
FIG. 4 is a table with the experimentally determined measurement data of Test 2, for the conventional treatment of a batch of a material having a moisture content and having a material temperature with a fluidization apparatus of a fluidization apparatus unit.

FIG. 2 is a schematic illustration of a basic profile of both the material temperature $T_G$ and the process end temperature $T_E$ shown plotted over the treatment time t, during the treatment of a batch of material G in a fluidization apparatus 1 of a fluidization apparatus unit 2 described as an example in FIG. 1. The material temperature $T_G$ is given in the unit "° C.", and the time in the unit "minutes". The material end temperature $T_{G, \ldots, E}$ constitutes the process end temperature $T_E$.

The treatment time t for drying the material G is divided into two treatment periods I and II.

In treatment period I, during the treatment of the material G of a batch in the fluidization apparatus 1, at least part of a liquid $F_G$ that constitutes the moisture content $f_G$ in the material G of the batch introduced into the fluidization chamber 6 evaporates as a result of the supplied heat Q introduced by means of the drying gas TG, such that the material G of the batch cools down from an initial material temperature $T_{G,\ldots,A}$ to a material minimum temperature $T_{G,\ldots,min}$ because of the associated removal of evaporation heat $\Delta Q_V$.

The material minimum temperature $T_{G,\ldots,min}$ can be found, for example, as the minimum value of the material temperature $T_G,\ldots$ in the processing period I or as the mean value of the material temperature $T_G,\ldots$ in a time interval $\Delta t$. In this case, the time interval $\Delta t$ expediently begins when the material minimum temperature $T_{G,\ldots,min}$ is reached. for calculating the material minimum temperature $T_{G,\ldots,min}$ in the form of the mean value of the material temperature $T_G,\ldots$ in a time interval $\Delta t$, the lowest material temperature $T_{G,\ldots,\Delta t}$ is weighted more heavily, preferably double.

Alternatively, the material minimum temperature $T_{G,\ldots,min}$ can be found as the mean value of the material temperature $T_G,\ldots$ in a temperature interval $\Delta T$, preferably in a temperature interval $\Delta T$ of $_+5°$ C. around the lowest material temperature $T_G,\ldots$, more preferably in a temperature interval $\Delta T$ of $_+3°$ C. around the lowest material temperature $T_G,\ldots$. In this case, too, there is the possibility when calculating the material minimum temperature $T_{G,\ldots,min}$ in the form of the mean value of the material temperature $T_G,\ldots$ in a specific temperature interval $\Delta T$ to weight the lowest material temperature $T_G,\ldots$ more heavily, preferably double.

In a treatment period II, further liquid $F_G$ is evaporated by the supplied heat Q provided by means of the drying gas TG, such that the material G of the batch heats up to a material end temperature $T_{G,\ldots,E}$, and the moisture content $f_{G,\ldots}$ of the material G of the batch is reduced to a residual moisture content $f_{G,\ldots,R}$ during treatment. When the material end temperature $T_{G,\ldots,E}$ is reached, the drying process is stopped, the treated material G is discharged from the fluidization apparatus 1 and is optionally sent for further treatment.

The material end temperature $T_{G,\ldots,E}$ is found as the sum of the individual material minimum temperature $T_{G,\ldots,min}$ for the material G of a batch and a prespecified increase temperature $T_+$ which is the same for each batch of the material G. The material minimum temperature $T_{G,\ldots,min}$ depends, among other things, on the amount of liquid $F_G$ in the material G and the drying gas moisture content $f_{TG}$.

The increase temperature $T_+$ is expediently determined in a reference measurement, wherein the increase temperature $T_+$ corresponds to a temperature difference between the material minimum temperature $T_{G,\ldots,min}$ of the material G treated in the reference measurement and the material end temperature $T_{G,\ldots,E}$ of the material G treated in the reference measurement.

The treatment of the first batch of the material G of a large number of batches of a material G then preferably serves as a reference measurement, or a separate treatment of the same material Gas in the later treatment of the batches of the material G is used as a reference measurement before the treatment of a large number of batches of the material G in a fluidization apparatus 1. In addition, there is the possibility of determining the increase temperature $T_+$ before the treatment of a large number of batches of a material G in a fluidization apparatus 1 from a database.

Tests 1 to 8, the measurement data for which are shown in tables and diagrams in FIGS. 3 to 14, were carried out with the following test equipment:

In the tables in FIGS. 3, 4, 6, 7, 9, 10, 12 and 13, the letter S denotes the target value and the letter I denotes the actual value measured in the corresponding test.

In Tests 1 ($V_1$) to 8 ($V_8$), the material G formed as wet granules was produced from a mixture of four different granulation materials, specifically 1.276 g lactose, 648 g microcrystalline cellulose (MCC), 61 g polyvinylpyrrolidone (PVP 30) and 40 g of talc, and 475 g of water as the granulating liquid, in the granulating device 16—a twin-screw extruder of the type Pharma 16 from Thermo Scientific™, with a throughput of 5 kg/h—and then introduced in batches into the fluidization apparatus 1 of the type GPCG 2 LabSystem from Glatt GmbH for treatment, in particular for drying. Textile filter elements T165P with filter openings of 20 μm were used as the deducting system 15 in the fluidization apparatus 1.

In the Tests 1 ($V_1$) to 4 ($V_4$), the conventional method according to the prior art for drying the material G was used, in which the material end temperature $T_{G,\ldots,E}$ was set to a fixed temperature value in advance, i.e., before the start of the test.

The process end temperature $T_E,\ldots$ was set at 42.1° C. for Tests 1 ($V_1$) to 4 ($V_4$) respectively, i.e., the treatment of the respective material G in the fluidization chamber 6 of the fluidization apparatus 1 was stopped when a material end temperature $T_{G,\ldots,E}$ of 42.1° C. was reached.

The tests 1 ($V_1$) and 2 ($V_2$) as well as Tests 3 ($V_3$) and 4 ($V_4$) are regarded as respective batches of the same material G.

In all of Tests 1 ($V_1$) to 4 ($V_4$), the drying gas temperature $T_{TG,\ldots,FE}$ which was pre-set for each of Tests 1 ($V_1$) to 4 ($V_4$), the drying gas moisture content $f_{T,\ldots,FE}$, and the drying gas volume flow $V_{TG,\ldots,FE}$ at the fluid inlet 11 of the fluidization apparatus 1 were kept constant over the treatment time t.

The table shown in FIG. 3 shows measurement data from Test 1 ($V_1$), in which the fluidization chamber 6 of the fluidization apparatus 1 has already been preconditioned at the fluid inlet 11 with a drying gas TG that has a drying gas temperature $T_{TG,V1,FE}$ of 60° C., a drying gas moisture content $f_{TG,V1,FE}$ of 7.6 g/kg, and a drying gas volume flow $V_{TG,V1,FE}$ of 70 m³/h.

FIG. 4 shows a table of measurement data for Test 2 ($V_2$), in which the fluidization chamber 6 of the fluidization apparatus 1 was preconditioned at the fluid inlet 11 with a drying gas TG which has a drying gas temperature $T_{TG,V2,FE}$ of 60° C., a drying gas moisture content $f_{TG,V2,FE}$ of 19.5 g/kg, and a drying gas volume flow $V_{TG,V2,FE}$ of 70 m³/h.

As such, Tests 1 ($V_1$) and 2 ($V_2$) differed only in the drying gas moisture content $f_{TG,\ldots,FE}$ of the drying gas TG.

Figures 5, 6, 7:
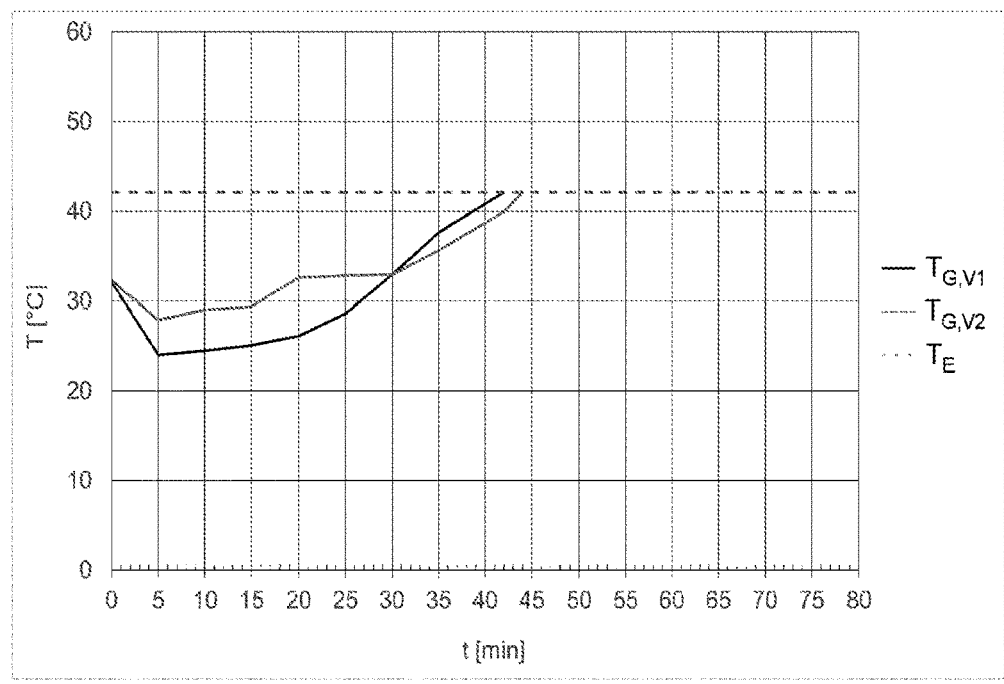
FIG. 5 is a diagram with the profile of the material temperature of Tests 1 and 2 and the process end temperature, plotted over time.
FIG. 6 is a table with the experimentally determined measurement data of Test 3, for the conventional treatment of a batch of a material having a moisture content and having a material temperature with a fluidization apparatus of a fluidization apparatus unit.
FIG. 7 is a table with the experimentally determined measurement data of Test 4, for the conventional treatment of a batch of a material having a moisture content and having a material temperature with a fluidization apparatus of a fluidization apparatus unit.

The diagram shown in FIG. 5 shows the material temperature $T_G,\ldots$ during the treatment of the material G of a batch in the fluidization apparatus 1 of the fluidization apparatus unit 2 for Tests 1 ($V_1$) and 2 ($V_2$).

As already explained in FIG. 2, during the treatment of the material G of a batch in the fluidization apparatus 1 in a first treatment period I, at least part of a liquid $F_G$ which constitutes the moisture content $f_{G,\ldots}$ in the material G evaporates from the material G of the batch introduced into the fluidization chamber 6 as the result of the supplied heat Q provided by means of the drying gas TG, such that the material G of the batch cools down from an initial material temperature $T_{G,\ldots,A}$ to a material minimum temperature $T_{G,\ldots,min}$ because of an associated removal of evaporation heat $\Delta Q_V$.

In a second treatment period II, liquid $F_G$ continues to evaporate due to the supplied heat Q provided by the drying gas TG, such that the material G of the batch heats up to a material end temperature $T_{G,\ldots,E}$, and the moisture content $f_{G,\ldots}$ of the material G of the batch is reduced to a residual moisture content $f_{G,\ldots,R}$ during the treatment.

In Test 1 ($V_1$), the material temperature $T_{G,V1}$ falls during the treatment of the material G in the first treatment period I, which lasts 20 minutes, from an initial material temperature $T_{G,V1,A}$ of 32.1° C. to a material temperature $T_{G,V1}$ of 26.1° C., wherein the material minimum temperature $T_{G,V1,min}$ of 24.0° C. is reached after 5 minutes in the first treatment period I. In the second treatment period II, which lasts 22 minutes, the material G is then heated to the material end temperature $T_{G,V1,E}$ of 42.1° C.; when this temperature is reached, the treatment of the material G is terminated. The material G is dried by the treatment during a treatment time $t_{V1}$ of 42 minutes to a residual moisture content $f_{G,V1,R}$ of 2.75%.

In Test 2 ($V_2$), the material temperature $T_{G,V2}$ falls during the treatment of the material G in the first treatment period I, lasting 15 minutes, from an initial material temperature $T_{G,V2,A}$ of 32.3° C. to a material temperature $T_{G,V2}$ of 29.4° C. After 5 minutes, in the first treatment period I, the material minimum temperature $T_{G,V2,min}$ of 27.9° C. is reached. In the second treatment period II, which lasts 27 minutes, the material G is then heated to the material end temperature $T_{G,V2,E}$ of 42.1° C.; when this temperature is reached, the treatment of the material G is terminated. The material G is dried by the treatment to a residual moisture content $f_{G,V2,R}$ of 4.75% for a treatment time $t_{V2}$ of 44 minutes.

In summary, with the same material G to be treated of a batch during drying to a prespecified material end temperature $T_{G, \ldots, E}$ of 42.1° C. in Tests 1 ($V_1$) and 2 ($V_2$), due to the different drying gas moisture contents $f_{TG, \ldots, FE}$ at the fluid inlet 11, different residual moisture contents $f_{G, \ldots, R}$ are reached. The residual moisture content $f_{G,V1,R}$ in the material G after the treatment according to Test 1 is lower than the residual moisture content $f_{G,V2,R}$ in the material G after the treatment according to Test 2, despite the shorter treatment time t. With respect to the higher residual moisture content $f_{G,V2,R}$ of Test 2 ($V_2$), the difference between the residual moisture content $f_{G,V1,R}$ for Test 1 ($V_1$) and the residual moisture content $f_{G,V2,R}$ for Test 2 ($V_2$) after the treatment time t of the corresponding test is 42.1%.

The table in FIG. 6 shows measurement data from Test 3 ($V_3$), in which the fluidization chamber 6 of the fluidization apparatus 1 was already preconditioned at the fluid inlet 11 with a drying gas TG that has a drying gas temperature $T_{TG,V3,FE}$ of 65° C., a drying gas moisture content $f_{TG,V3,FE}$ of 7 g/kg and a drying gas volume flow $V_{TG,V3,FE}$ of 70 m³/h.

FIG. 7 shows a table with measurement data for Test 4 ($V_4$), in which the fluidization chamber 6 of the fluidization apparatus 1 was preconditioned at the fluid inlet 11 with a drying gas TG that has a drying gas temperature $T_{TG,V4,FE}$ of 65° C., a drying gas moisture content $f_{TG,V4,FE}$ of 19.5 g/kg, and a drying gas volume flow $V_{TG,V4,FE}$ of 70 m³/h.

As such, Tests 3 ($V_3$) and 4 ($V_4$) differed only in the drying gas moisture content $f_{TG, \ldots, FE}$ of the drying gas TG.

Figures 8, 9:
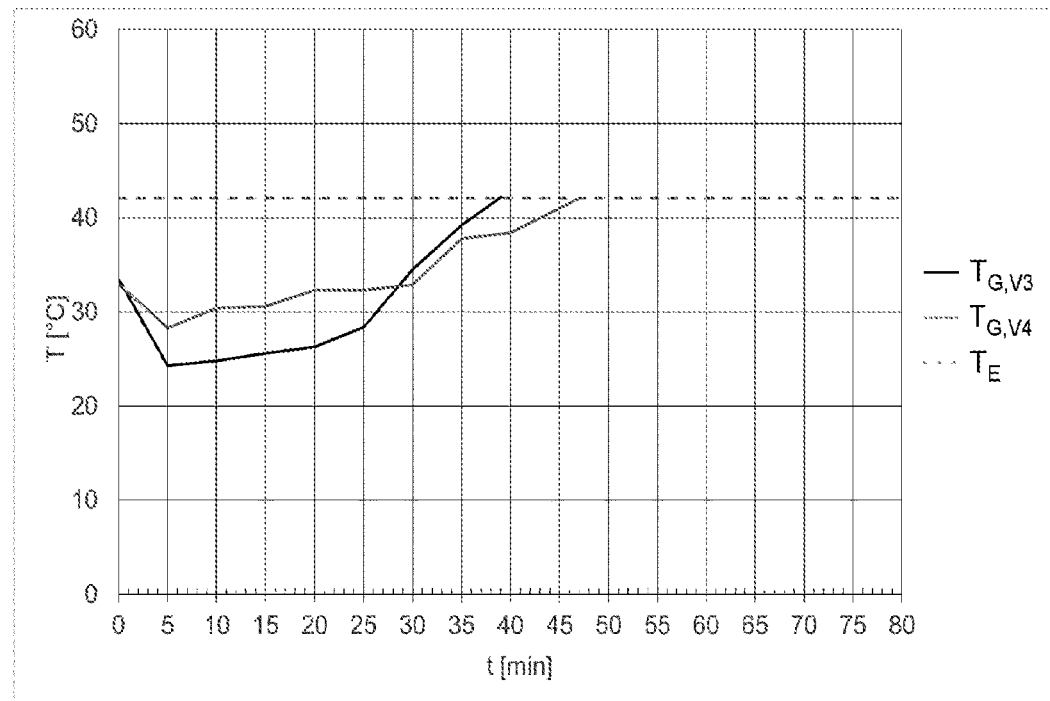
FIG. 8 is a diagram with the profile of the material temperature of Tests 3 and 4 and the process end temperature, plotted over time.
FIG. 9 is a table with the experimentally determined measurement data of Test 5, for the treatment of a batch of a material having a moisture content and having a material temperature with a fluidization apparatus of a fluidization apparatus unit according to the preferred method.

The diagram in FIG. 8 shows the material temperature $T_{G, \ldots}$ during the treatment of the material G of a batch in the fluidization apparatus 1 of the fluidization apparatus unit 2 for Tests 3 ($V_3$) and 4 ($V_4$).

As already explained in FIG. 2, during the treatment of the material G of a batch in the fluidization apparatus 1 in a first treatment period I, at least part of a liquid $F_G$ which constitutes the moisture content $f_{G, \ldots}$ in the material G evaporates from the material G of the batch introduced into the fluidization chamber 6 as the result of the supplied heat Q provided by means of the drying gas TG, such that the material G of the batch cools down from an initial material temperature $T_{G, \ldots, A}$ to a material minimum temperature $T_{G, \ldots, min}$ because of an associated removal of evaporation heat $\Delta Q_V$.

In a second treatment period II, more liquid F evaporates as a result of the supplied heat Q provided by means of the drying gas TG, such that the material G in the batch heats up to a material end temperature $T_{G, \ldots, E}$ and the moisture content $f_{G, \ldots}$ of the material of the batch is reduced to a residual moisture content $f_{G, \ldots, R}$ during the treatment.

In Test 3 ($V_3$), the material temperature $T_{G,V3}$ falls during the treatment of the material G in the first treatment period I, lasting 25 minutes, from an initial material temperature $T_{G,V3,A}$ of 33.5° C. to a material temperature $T_{G,V3}$ of 28.4° C., with the material minimum temperature $T_{G,V3,min}$ of 24.3° C. being reached after 5 minutes in the first treatment period I. In the second treatment period II, which lasts 14 minutes, the material G is then heated to the material end temperature $T_{G,V3,E}$ of 42.1° C.; when this temperature is reached, the treatment of the material G is terminated. The material G is dried by the treatment to a residual moisture content $f_{G,V3,R}$ of 2.84% during a treatment time $t_{V3}$ of 39 minutes.

In Test 4 ($V_4$), the material temperature $T_{G,V4}$ falls during the treatment of the material G in the first treatment period I, which lasts 30 minutes, from an initial material temperature $T_{G,V4,A}$ of 33.0° C. to a material temperature $T_{G,V4}$ of 29.8° C. After 5 minutes, in the first treatment period I, the material minimum temperature $T_{G,V4,min}$ of 28.3° C. is reached. In the second treatment period II, which lasts 17 minutes, the material G is then heated to the material end temperature $T_{G,V4,E}$ of 42.1° C.; when this temperature is reached, the treatment of the material G is terminated. The material G is dried by the treatment to a residual moisture content $f_{G,V4,R}$ of 4.95% during a treatment time $t_{V4}$ of 47 minutes.

In summary, with the same material G to be treated of a batch during drying to a prespecified material end temperature $T_{G, \ldots, E}$ of 42.1° C. in Tests 3 ($V_3$) and 4 ($V_4$) due to the different drying gas moisture contents $f_{TG, \ldots, FE}$ at the fluid inlet 11, different residual moisture contents $f_{G, \ldots, R}$ are reached. The residual moisture content $f_{G,V3,R}$ in the material G after the treatment according to Test 3 is lower than the residual moisture content $f_{G,V4,R}$ in the material G after the treatment according to Test 4, despite the shorter treatment time t. With respect to the higher residual moisture content $f_{G,V4,R}$ of Test 4 ($V_4$), the difference between the residual moisture content $f_{G,V3,R}$ for Test 3 ($V_3$) and the residual moisture content $f_{G,V4,R}$ for Test 4 ($V_4$) after the treatment time t of the corresponding test is 42.6%.

Such fluctuations in the residual moisture content $f_{G, \ldots, R}$ in the treated material G, as arose in Tests 1 ($V_1$) to 4 ($V_4$), can, as already explained, lead to difficulties in further processing, either due to an excessive residual moisture content $f_{G, \ldots, R}$—such that there is a risk of microbiological contamination—or due to insufficient residual moisture content $f_{G, \ldots, R}$—such that problems can arise, for example, when the material G is subsequently compressed into tablets.

In Tests 5 ($V_5$) to 8 ($V_8$), the preferred method for drying the material G in the fluidization apparatus unit 2 was used, wherein the material end temperature $T_{G, \ldots, E}$ is found as the sum of the individual material minimum temperature $T_{G, \ldots, min}$ for the material of a batch and a prespecified increase temperature $T_+$ that is the same for each batch of the material G.

Tests 5 ($V_5$) and 6 ($V_6$), as well as Tests 7 ($V_7$) and 8 ($V_8$) are regarded as respective batches of the same material G.

The temperature difference between the material minimum temperature $T_{G,V1,min}$ and the material end temperature $T_{G,V1,E}$ from Test 1 ($V_1$) was selected as the increase temperature $T_+$ for Tests 5 ($V_5$) to 8 ($V_8$). The increase temperature $T_+$ was thus 18.1° C. for all of Tests 5 ($V_5$) to 8 ($V_8$), corresponding to Test 1 ($V_1$).

In all of Tests 5 ($V_5$) to 8 ($V_8$), the drying gas temperature $T_{TG, \ldots, FE}$ which was pre-set for each of Tests 5 ($V_5$) to 8 ($V_8$) respectively, the drying gas moisture content $f_{TG, \ldots, FE}$, and the drying gas volume flow $V_{TG, \ldots, FE}$ at the fluid inlet 11 of the fluidization apparatus 1 were kept constant over the treatment time t.

The table in FIG. 9 shows measurement data from test 5 ($V_5$), in which the fluidization chamber 6 of the fluidization apparatus 1 has already been preconditioned at the fluid inlet 11 with a drying gas TG that has a drying gas temperature $T_{TG,V5,FE}$ of 60° C. a drying gas moisture content $f_{TG,V5,FE}$ of 8.2 g/kg and a drying gas volume flow $V_{TG,V5,FE}$ of 70 m³/h.

Figures 10, 11:
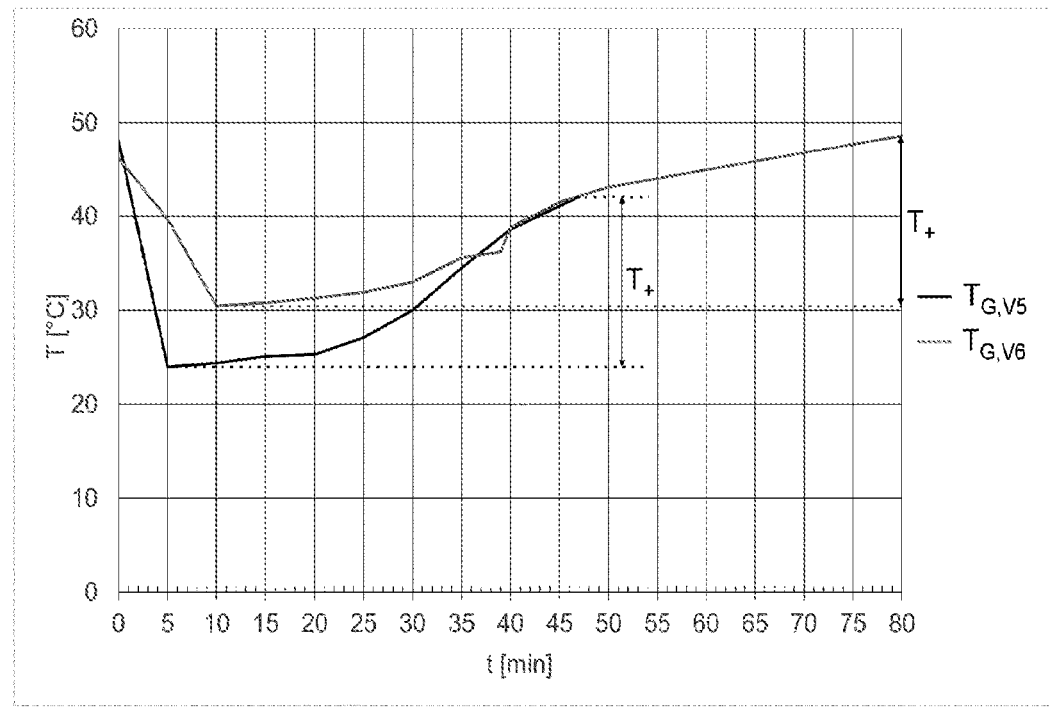
FIG. 10 is a table with the experimentally determined measurement data of Test 6, for the treatment of a batch of a material having a moisture content and having a material temperature with a fluidization apparatus of a fluidization apparatus unit according to the preferred method.
FIG. 11 is a diagram with the profile of the material temperature of Tests 5 and 6 and the process end temperature, plotted over time.

FIG. 10 shows a table of measurement data for Test 6 ($E_6$), in which the fluidization chamber 6 of the fluidization apparatus 1 was preconditioned at the fluid inlet 11 with a drying gas TG which has a drying gas temperature $T_{TG,V6,FE}$ of 60° C., a drying gas moisture content $f_{TG,V6,FE}$ of 20 g/kg, and a drying gas volume flow $V_{TG,V6,FE}$ of 70 m³/h.

As such, Tests 5 ($V_5$) and 6 ($V_6$) differed only in the drying gas moisture content $f_{TG, \ldots, FE}$ of the drying gas TG.

The process end temperature $T_{V5,E}$ during Test 5 ($V_5$) was therefore the sum of the material minimum temperature $T_{G,V5,min}$ and the increase temperature $T_+$, and was 42.1° C.—i.e., the treatment of the material G in the fluidization chamber 6 of the fluidization apparatus 1 was stopped when the material end temperature $T_{G,V5,E}$ of 42.1° C. was reached.

The process end temperature $T_{V6,E}$ during Test 6 ($V_6$) was therefore the sum of the material minimum temperature $T_{G,V6,min}$ and the increase temperature $T_+$, and was 48.6° C.—i.e., the treatment of the material G in the fluidization chamber 6 of the fluidization apparatus 1 was stopped when the material end temperature $T_{G,V6,E}$ of 48.6° C. was reached.

The diagram shown in FIG. 11 depicts the material temperature $T_G, \ldots$ during the treatment of the material G of a batch in the fluidization apparatus 1 of the fluidization apparatus unit 2 for the Tests 5 ($V_5$) and 6 ($V_6$).

As already explained in FIG. 2, during the treatment of the material G of a batch in the fluidization apparatus 1 in a first treatment period I, at least part of a liquid $F_G$ which constitutes the moisture content $f_G, \ldots$ in the material G evaporates from the material G of the batch introduced into the fluidization chamber 6 as a result of a supplied heat Q provided by means of the drying gas TG, such that the material G of the batch cools down from an initial material temperature $T_{G, \ldots, A}$ to a material minimum temperature $T_{G, \ldots, min}$ because of an associated removal of evaporation heat $\Delta Q_V$.

In a second treatment period II, more liquid F evaporates as a result of the supplied heat Q provided by means of the drying gas TG, such that the material G in the batch heats up to a material end temperature $T_{G, \ldots, E}$ and the moisture content $f_G, \ldots$ of the material G of the batch is reduced to a residual moisture content $f_{G, \ldots, R}$ during the treatment.

In Test 5 ($V_5$), the material temperature $T_{G,V5}$ falls during the treatment of the material G in the first treatment period I, which lasts 30 minutes, from an initial material temperature $T_{G,V5,A}$ of 48.1° C. to a material temperature $T_{G,V5}$ of 30° C. After 5 minutes, in the first treatment period I, the material minimum temperature $T_{G,V5,min}$ of 24.0° C. is reached. In the second treatment period II, which lasts 17 minutes, the material G is then heated to the material end temperature $T_{G,V5,E}$ of 42.1° C.; when this temperature is reached, the treatment of the material G is terminated. The material G is dried by the treatment to a residual moisture content $f_{G,V5,R}$ of 2.91% during a treatment time $t_{V5}$ of 47 minutes.

In Test 6 ($V_6$), the material temperature $T_{G,V6}$ falls during the treatment of the material G in the first treatment period I, which lasts 35 minutes, from an initial material temperature $T_{G,V6,A}$ of 46.2° C. to a material temperature $T_{G,V6}$ of 35.6° C. After 10 minutes, in the first treatment period I, the material minimum temperature $T_{G,V6,min}$ of 30.5° C. is reached. In the second treatment period II, which lasts 45 minutes, the material G is then heated to the material end temperature $T_{G,V6,E}$ of 48.6° C.; when this temperature is reached, the treatment of the material G is terminated. The material G is dried by the treatment to a residual moisture content $f_{G,V6,R}$ of 2.84% during a treatment time $t_{V6}$ of 80 minutes.

Overall, using the preferred method in the treatment, in particular drying, of the material G in a so fluidization apparatus 1 of the fluidization apparatus unit 2 substantially achieves the same residual moisture content $f_{G, \ldots, R}$. With respect to the higher residual moisture content $f_{G,V5,R}$ of Test 5 ($V_5$), the difference between the residual moisture content $f_{G,V5, R}$ for Test 5 ($V_5$) and the residual moisture content $f_{G,V6,R}$ and Test 6 ($V_6$) after the treatment time t of the corresponding test is only 1.7%.

The table in FIG. 12 shows measurement data from Test 7 ($V_7$), in which the fluidization chamber 6 of the fluidization apparatus 1 was already preconditioned at the fluid inlet 11 with a drying gas TG that has a drying gas temperature $T_{TG,V7,FE}$ of 65° C., a drying gas moisture content $f_{TG,V7,FE}$ of 8 g/kg and a drying gas volume flow $V_{TG,V7,FE}$ of 70 m³/h.

FIG. 13 shows a table of measurement data for experiment 8 ($V_8$), in which the fluidization chamber 6 of the fluidization apparatus 1 was preconditioned at the fluid inlet 11 with a drying gas TG which has a drying gas temperature $T_{TG,V8,FE}$ of 65° C., a drying gas moisture content $f_{TG,V8,FE}$ of 20 g/kg and a drying gas volume flow $V_{TG,V8,FE}$ of 70 m³/h.

As such, Tests 7 ($V_7$) and 8 ($V_8$) differed only in the drying gas moisture content $f_{TG, \ldots, FE}$ of the drying gas TG.

The process end temperature $T_{V7,E}$ during Test 7 ($V_7$) was therefore the sum of the material minimum temperature $T_{G,V7,min}$ and the increase temperature $T_+$, and was 41.8° C.—i.e., the treatment of the material G in the fluidization chamber 6 of the fluidization apparatus 1 was stopped when the material end temperature $T_{G,V5,E}$ of 41.8° C. was reached.

The process end temperature $T_{V8,E}$ during Test 8 ($V_8$) was therefore the sum of the material minimum temperature $T_{G,V8,min}$ and the increase temperature $T_+$, and was 49.3° C.—i.e., the treatment of the material G in the fluidization chamber 6 of the fluidization apparatus 1 was stopped when the material end temperature $T_{G,V6,E}$ of 49.3° C. was reached.

Figure 14:
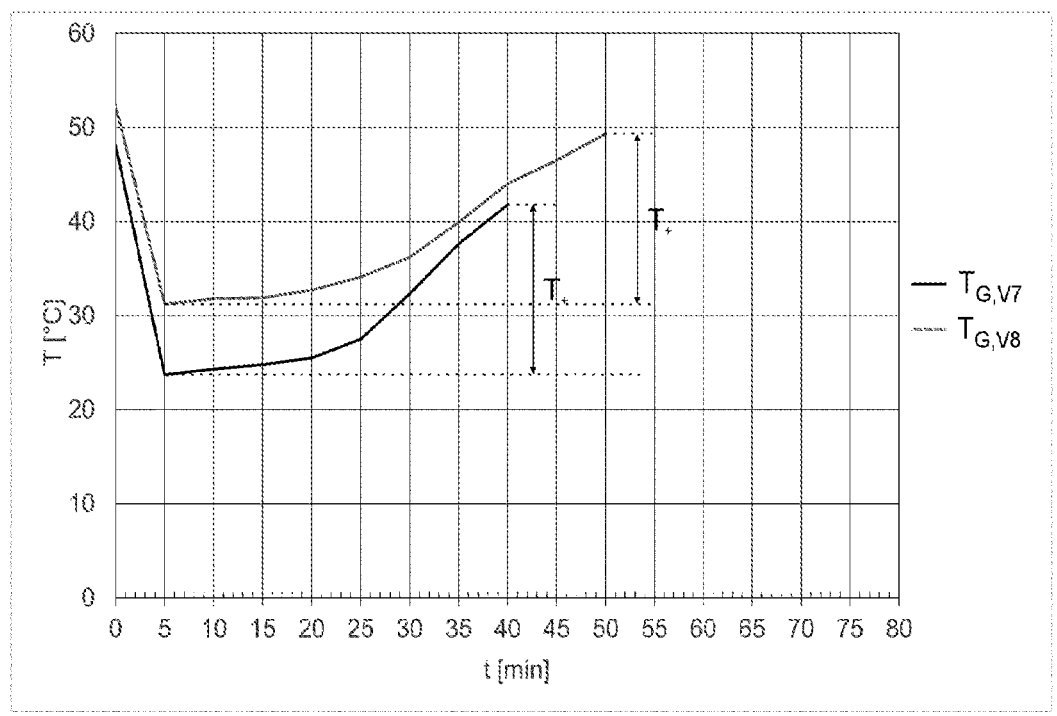
FIG. 14 is a diagram with the profile of the material temperature of Tests 7 and 8 and the process end temperature, plotted over time.

The diagram in FIG. 14 shows the material temperature $T_G, \ldots$ during the treatment of the material G of a batch in the fluidization apparatus 1 of the fluidization apparatus unit 2 for Tests 7 ($V_7$) and 8 ($V_8$).

As already explained in FIG. 2, during the treatment of the material G of a batch in the fluidization apparatus 1 in a first treatment period I, at least part of a liquid $F_G$ which constitutes the moisture content $f_G, \ldots$ in the material G evaporates from the material G of the batch introduced into the fluidization chamber 6 as a result of a supplied heat Q provided by means of the drying gas TG, such that the material G of the batch cools down from an initial material temperature $T_{G,\ldots,A}$ to a material minimum temperature $T_{G,\ldots,min}$ because of an associated removal of evaporation heat $\Delta Q_V$.

In a second treatment period II, liquid $F_G$ continues to evaporate due to the supplied heat Q provided by the drying gas TG, such that the material G of the batch heats up to a material end temperature $T_{G,\ldots,E}$, and the moisture content $f_G, \ldots$ of the material G of the batch is reduced to a residual moisture content $f_{G,\ldots,R}$ during the treatment.

In Test 7 ($V_7$), the material temperature $T_{G,V7}$ falls during the treatment of the material G in the first treatment period I, which lasts 25 minutes, from an initial material temperature $T_{G,V7,A}$ of 48.2° C. to a material temperature $T_{G,V7}$ of 27.5° C. After 5 minutes, in the first treatment period I, the material minimum temperature $T_{G,V7,min}$ of 23.7° C. is reached. In the second treatment period II, which lasts 15 minutes, the material G is then heated to the material end temperature $T_{G,V7,E}$ of 42.1° C.; when this temperature is reached, the treatment of the material G is terminated. The material G is dried by the treatment to a residual moisture content $f_{G,V7,R}$ of 2.40% during a treatment time $t_{V7}$ of 40 minutes.

In Test 8 ($V_8$), the material temperature $T_{G,V8}$ falls during the treatment of the material G in the first treatment period I, which lasts 30 minutes, from an initial material temperature $T_{G,V8,A}$ of 52.4° C. to a material temperature $T_{G,V8}$ of 36.2° C. After 5 minutes, the material minimum temperature $T_{G,V8,min}$ of 31.2° C. is reached in the first treatment period I. In the second treatment period II, which lasts 20 minutes, the material G is then heated to the material end temperature $T_{G,V8,E}$ of 49.3° C.; when this temperature is reached, the treatment of the material G is terminated. The material G is dried by the treatment to a residual moisture content $f_{G,V8,R}$ of 2.67% during a treatment $t_{V8}$ time Lis of 50 minutes.

Overall, using the preferred method in the treatment, in particular drying, of the material G in a fluidization apparatus 1 of the fluidization apparatus unit 2 substantially achieves the same residual moisture content $f_{G,\ldots,R}$. With respect to the higher residual moisture content $f_{G,V8,R}$ of Test 8 ($V_8$), the difference between the residual moisture content $f_{G,V7,R}$ for Test 7 ($V_7$) and the residual moisture content $f_{G,V8,R}$ for Test 8 ($V_8$) after the treatment time t of the corresponding test is only 10.1%.

With the preferred method, a material G from a first batch ($V_5$, $V_7$) after treatment in the fluidization apparatus unit 2 has essentially the same residual moisture content $f_{G,\ldots,R}$ as an identical material G from a second batch ($V_6$, $V_8$).

As such, the fluctuations in the residual moisture content $f_{G,\ldots,R}$ in the treated material G of the different batches are negligible according to the preferred method compared to the known methods, and the treated material G can be readily sent for further processing—for example, tablet compression.

The invention claimed is:

1. A method for treating a large number of batches of a material having a moisture content and a material temperature in a fluidization apparatus unit comprising a fluidization apparatus, wherein the fluidization apparatus of the fluidization apparatus unit has a fluidization chamber which has a material inlet and a material outlet, and which also comprises a fluid inlet and a fluid outlet for a drying gas which fluidizes the material in the fluidization chamber and which has a drying gas moisture content, the method comprising:

during a treatment of the material of a batch in the fluidization apparatus in a first treatment period, at least part of a liquid which constitutes the moisture content of the material of the batch introduced into the fluidization chamber is evaporated by a supplied heat provided by the drying gas, such that the material of the batch cools down from an initial material temperature to a material minimum temperature as a result of an associated removal of evaporation heat; and in a second treatment period, liquid is further evaporated by the supplied heat provided by the drying gas, such that the material of the batch heats up to a material end temperature, and consequently the moisture content of the material of the batch is reduced to a residual moisture content, wherein the material end temperature is found as a sum of an individual material minimum temperature for the material of a batch and a prespecified increase temperature that is a same value for each batch of the material.

2. The method according to claim 1, wherein the increase temperature is determined in a reference measurement, wherein the increase temperature corresponding to a temperature difference between the material minimum temperature of the material treated in the reference measurement and the material end temperature of the material treated in the reference measurement.

3. The method according to claim 2, wherein the treatment of a first batch of material of a large number of batches of the material in the fluidization apparatus serves as a reference measurement.

4. The method according to claim 2, wherein the reference measurement is carried out before the treatment of a large number of batches of a material in the fluidization apparatus, as a separate treatment.

5. The method according to claim 1, wherein the increase temperature is determined from a database before the treatment of a large number of batches of a material in the fluidization apparatus.

6. The method according to claim 1, wherein the material to be treated is produced in a granulating device arranged upstream of the fluidization apparatus, and is then fed to the fluidization apparatus.

7. The method according to claim 1, wherein the material minimum temperature is found as a mean value of the material temperature in a time interval.

8. The method according to claim 7, wherein the time interval begins when the material minimum temperature is reached.

9. The method according to claim 7, wherein, for calculating the mean value of the material temperature in the time interval, a lowest material temperature in this the time interval is weighted more heavily.

10. The method according to claim 1, wherein the material minimum temperature is found as a mean value of the material temperature in a temperature interval.

11. The method according to claim 10, wherein, for calculating the mean value of the material temperature in the temperature interval, a lowest material temperature is weighted more heavily in the temperature interval.

12. The method according to claim 1, wherein the fluidization apparatus has a spray device which sprays the material of a batch with a liquid at least at times during the first and/or second treatment period.

13. The method according to claim 1, wherein treatment of a batch of the material in the fluidization apparatus unit comprising the fluidization apparatus is stopped after the material end temperature has been reached.

14. The method according to claim 10, wherein the material minimum temperature is found as a mean value of the material temperature in a temperature interval of $_+5°$ C. around the lowest material temperature.

15. The method according to claim 10, wherein the material minimum temperature is found as a mean value of the material temperature in a temperature interval of $_+3°$ C. around the lowest material temperature.

\* \* \* \* \*

UNITED STATES PATENT AND TRADEMARK OFFICE
CERTIFICATE OF CORRECTION

| | | |
|---|---|---|
| PATENT NO. | : 12,447,450 B2 | Page 1 of 1 |
| APPLICATION NO. | : 18/010106 | |
| DATED | : October 21, 2025 | |
| INVENTOR(S) | : Jochen Thies | |

It is certified that error appears in the above-identified patent and that said Letters Patent is hereby corrected as shown below:

In the Claims

Column 16, Line 55, Claim 9, delete "in this" and insert -- in --

Signed and Sealed this
Twenty-third Day of December, 2025

John A. Squires
*Director of the United States Patent and Trademark Office*